US010430961B2

(12) United States Patent
Qian et al.

(10) Patent No.: US 10,430,961 B2
(45) Date of Patent: Oct. 1, 2019

(54) USING SATELLITE IMAGERY TO ENHANCE A 3D SURFACE MODEL OF A REAL WORLD CITYSCAPE

(71) Applicant: ObjectVideo Labs, LLC, Tysons, VA (US)

(72) Inventors: Gang Qian, McLean, VA (US); Yunxian Zhou, Herndon, VA (US); David Conger, Sterling, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 45 days.

(21) Appl. No.: 15/382,521

(22) Filed: Dec. 16, 2016

(65) Prior Publication Data

US 2017/0200309 A1    Jul. 13, 2017

Related U.S. Application Data

(60) Provisional application No. 62/268,478, filed on Dec. 16, 2015.

(51) Int. Cl.
*G06T 7/60* (2017.01)
*G06T 15/04* (2011.01)
*G06T 17/05* (2011.01)

(52) U.S. Cl.
CPC ............... *G06T 7/60* (2013.01); *G06T 15/04* (2013.01); *G06T 17/05* (2013.01); *G06T 2207/10032* (2013.01)

(58) Field of Classification Search
USPC ................................. 345/419, 427
See application file for complete search history.

(56) References Cited

U.S. PATENT DOCUMENTS

| 8,339,394 | B1 * | 12/2012 | Lininger | G06T 15/04 |
| | | | | 345/419 |
| 8,896,601 | B1 * | 11/2014 | Norman | G06F 17/30241 |
| | | | | 345/419 |
| 8,941,685 | B1 * | 1/2015 | Chapin | G06Q 30/0241 |
| | | | | 345/629 |
| 2008/0221843 | A1 * | 9/2008 | Shenkar | G06T 17/05 |
| | | | | 703/1 |

(Continued)

*Primary Examiner* — Kimbinh T Nguyen
(74) *Attorney, Agent, or Firm* — Fish & Richardson P.C.

(57) ABSTRACT

Methods and apparatus are disclosed for enhancing urban surface model with image data obtained from a satellite image. Three dimensional models of an urban cityscape obtained from digital surface models may comprise surface location information but lack image information associated with the cityscape, such as the color and texture of building facades. The location of the satellite at the time of recording the satellite image interest may be obtained from metadata associated with the satellite image. A 3D model of a cityscape corresponding to the satellite image may be subjected to a transformation operation to determine portions of the 3D model that are viewable from a location corresponding to the location of the satellite when taking the picture. Visible facades buildings of the 3D model may be identified and mapped to portions of the satellite image which may then be used in rendering 2D images from the 3D model.

16 Claims, 13 Drawing Sheets

(56) References Cited

U.S. PATENT DOCUMENTS

| | | | |
|---|---|---|---|
| 2009/0322742 A1* | 12/2009 | Muktinutalapati | G06T 7/33 345/420 |
| 2011/0148866 A1* | 6/2011 | Chu | G06T 15/04 345/419 |
| 2013/0060540 A1* | 3/2013 | Frahm | G06T 15/06 703/2 |
| 2014/0320488 A1* | 10/2014 | Ege | G06T 17/05 345/420 |
| 2014/0368507 A1* | 12/2014 | Altman | G06T 17/05 345/426 |
| 2014/0369595 A1* | 12/2014 | Pavlidis | G06K 9/00637 382/154 |
| 2015/0029182 A1* | 1/2015 | Sun | G06K 9/00214 345/419 |
| 2017/0084077 A1* | 3/2017 | Liu | G06T 17/05 |
| 2017/0090460 A1* | 3/2017 | Andrew | B33Y 50/02 |
| 2017/0116781 A1* | 4/2017 | Babahajiani | G06T 17/20 |

* cited by examiner

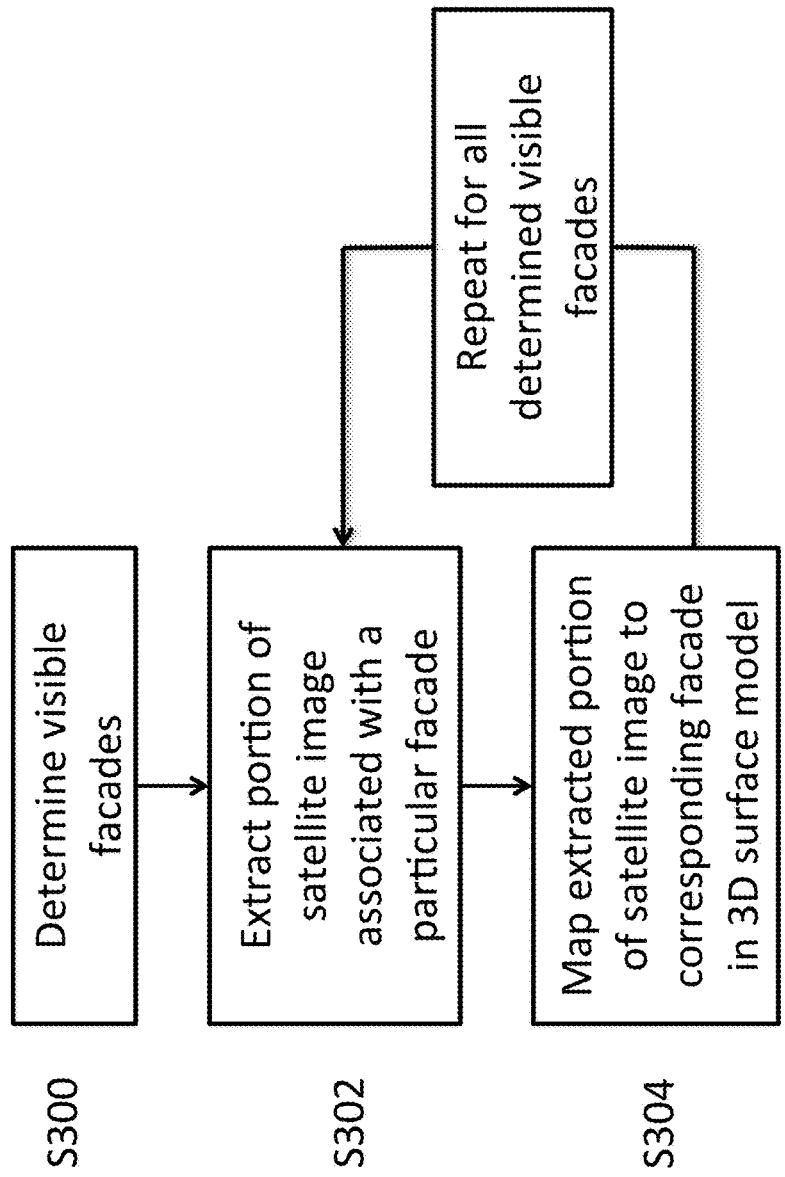

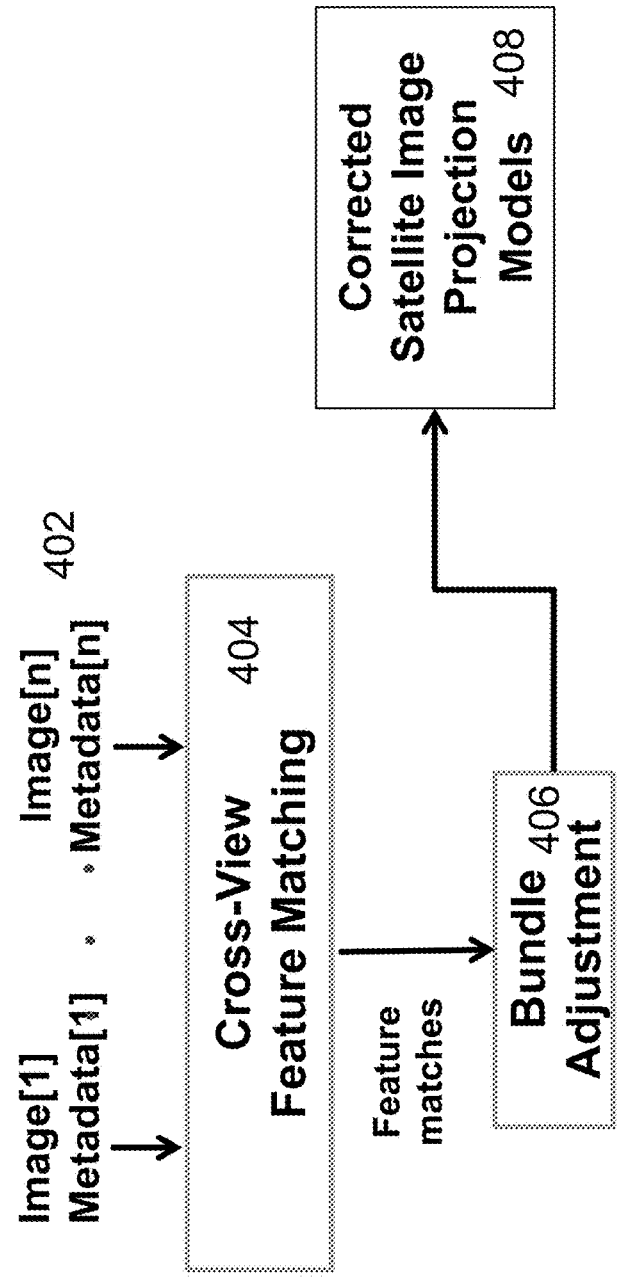

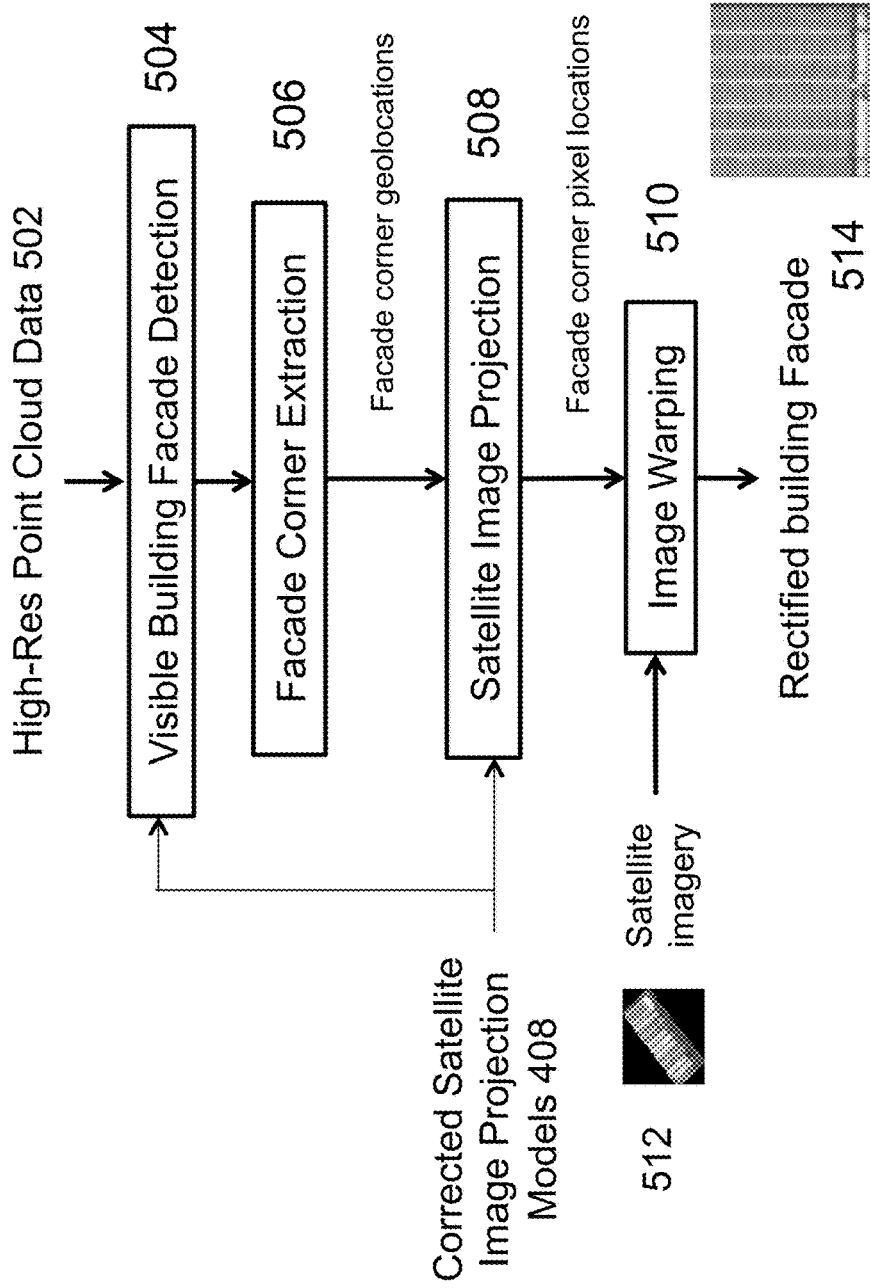

USING SATELLITE IMAGERY TO ENHANCE A 3D SURFACE MODEL OF A REAL WORLD CITYSCAPE

RELATED APPLICATION

This Non-provisional application claims priority under 35 U.S.C. 119(e) to Provisional Application No. 62/268,478, filed Dec. 16, 2015, the contents of which are incorporated by reference in their entirety.

STATEMENT REGARDING FEDERALLY SPONSORED RESEARCH OR DEVELOPMENT

This invention was made with government support Air Force Research Laboratory Contract FA8650-12-C-7212 awarded by Intelligence Advanced Research Projects Activity (IARPA). The government has certain rights in the invention.

FIELD OF THE INVENTION

This disclosure relates to systems and methods for enhancing a 3D surface models of a real world cityscape or a real world building by adding imagery detail obtained from satellite images of such real world cityscape or real world building.

BACKGROUND

A real world cityscape may be represented by a point cloud. Point cloud data may comprise a plurality of points, where each point is identified by a coordinate and represents a point of a determined surface location of a point on a building/cityscape. For example, the points may be defined using x, y and z coordinates in a Cartesian coordinate system, where the collection of points represents the surface of the cityscape, such as the surface of roads, sidewalks, buildings, etc. The point cloud may be obtained via measurement by a 3D scanner, such as LiDAR. LiDAR data of a cityscape may be obtained by flying over a location and scanning the ground area with a laser. LiDAR data may be obtained from public sources, such as, e.g., from the United States Interagency Elevation Inventory, the United States National Oceanic Atmospheric Administration (NOAA) and the United States Geological Survey.

Although point cloud data is useful for visually representing a scanned surface to a user, it may be insufficient to use as a computer model for other purposes due to an absence of information at locations between the individual points. Converting the point cloud data to a 3D surface model can address some of these deficiencies, but such a 3D surface model also lacks detailed information that may be desirable for certain applications. Systems and methods to automatically provide further detail to a 3D model of a real world cityscape are desired.

SUMMARY

Methods and apparatus are disclosed for enhancing urban surface model with image data obtained from a satellite image. Three dimensional models of an urban cityscape obtained from digital surface models may comprise surface location information but lack image information associated with the cityscape, such as the color and texture of building facades. The location of the satellite at the time of recording the satellite image interest may be obtained from metadata associated with the satellite image. A 3D model of a cityscape corresponding to the satellite image may be subjected to a transformation operation to determine portions of the 3D model that are viewable from a location corresponding to the location of the satellite when taking the picture. Visible facades buildings of the 3D model ma be identified and mapped to portions of the satellite image which may then be used in rendering 2D images from the 3D model. In some examples a satellite image projection model may be adjusted to more accurately determine geolocations of portions of the satellite image by analysis of a plurality of satellite images.

BRIEF DESCRIPTION OF THE DRAWINGS

The above and other objects and features will become apparent from the following description with reference to the following figures in which:

FIG. 3 illustrates an example of step S110 of FIG. 1;

FIG. 4 illustrates an example associated with step S100 of FIG. 1

FIGS. 5 and 7 are exemplary implementations.

DETAILED DESCRIPTION

Figure 1:
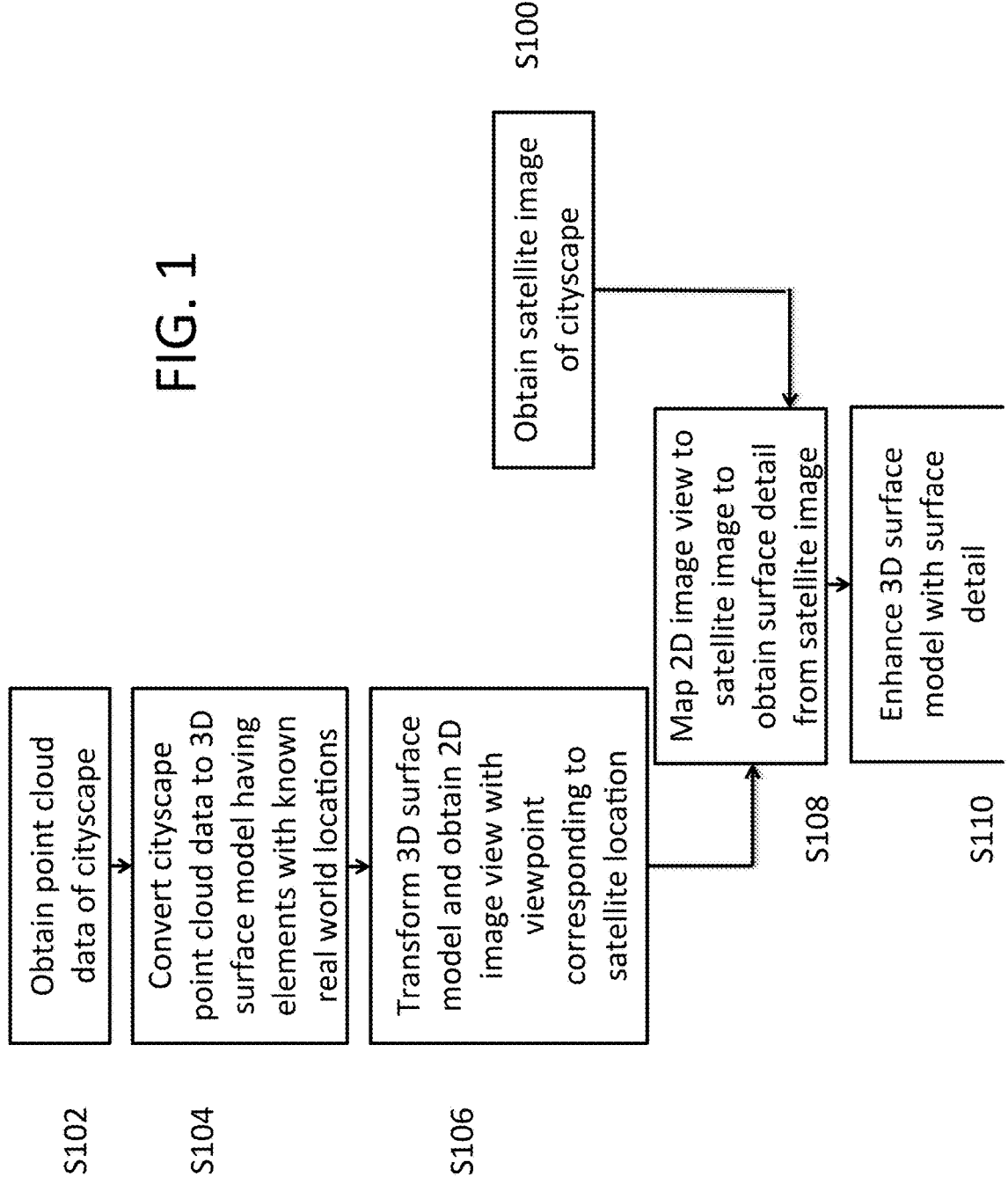
FIG. 1 is an exemplary method according to certain embodiments.

The present disclosure now will be described more fully hereinafter with reference to the accompanying drawings, in which various embodiments are shown. The invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

In the drawings, like numbers refer to like elements throughout. Though the different figures show various features of exemplary embodiments, these figures and their features are not necessarily intended to be mutually exclusive from each other. Rather, certain features depicted and described in a particular figure may also be implemented with embodiment(s) depicted in different figure(s), even if such a combination is not separately illustrated. Referencing such features/figures with different embodiment labels (e.g. "first embodiment") should not be interpreted as indicating certain features of one embodiment are mutually exclusive of and are not intended to be used with another embodiment.

Unless the context indicates otherwise, the terms first, second, third, etc., are used as labels to distinguish one element, component, or section from another element, component, or section (that may or may not be similar). Thus, a first element, component, or section discussed below in one section of the specification (or claim) may be referred to as a second element, component, or section in another section of the specification (or another claim).

As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/". With the exception of "consisting of" and "essentially consisting of," it will be further understood that all transition terms describing elements of a step, component, device, etc., are open ended. Thus, unless otherwise specified (e.g., with language such as "only," "without," etc.), the terms "comprising," "including," "having," etc., may specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "connected," "coupled to" or "on" another element, it can be directly connected/coupled to/on the other element or intervening elements may be present. In contrast, when an element is referred to as being "directly connected" or "directly coupled" to another element, or as "contacting" or "in contact with" another element, there are no intervening elements present.

Unless otherwise defined, all terms (including technical and scientific terms) used herein have the same meaning as commonly understood by one of ordinary skill consistent with their meaning in the context of the relevant art and/or the present application.

Each block, unit and/or module described herein may be embodied as a computer. Each block, unit and/or module described herein may comprise a separate computer, or some or all of the modules and/or units may be comprised of and share the hardware of the same computer. Connections and interactions between the blocks, units and/or modules may be hardwired and/or in the form of data (e.g., as data stored in and retrieved from memory of the computer, such as a register, buffer, cache, storage drive, etc.) Each block, unit and/or module may correspond to separate segment or segments of software (e.g., a subroutine) which configure the computer, or may correspond to segment(s) of software that also correspond to one or more other blocks, units and/or modules. The computer may comprise a processor (e.g., a microprocessor, a controller, a CPU, a GPU, etc.) or processors configured by software or may be dedicated hardware or firmware (e.g., an electronic or optical circuit). A "computer" may be one or more apparatuses and/or one or more systems that are capable of accepting a structured input, processing the structured input according to prescribed rules, and producing results of the processing as output. Examples of a computer include: a stationary and/or portable computer; a computer having a single processor, multiple processors, or multi-core processors; a general purpose computer; a supercomputer; a mainframe; a workstation; a micro-computer; a server; a client; a web appliance; a telecommunications device with internet access; a tablet; a personal digital assistant (PDA); application-specific hardware, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC).

"Software" refers to prescribed rules to operate a computer. Examples of software may include: software; code segments; instructions; applets; pre-compiled code; compiled code; interpreted code; computer programs; and programmed logic.

A "computer-readable medium" refers to any storage device used for storing data accessible by a computer. Examples of a computer-readable medium may include: a magnetic hard disk; a floppy disk; an optical disk, such as a CD-ROM and a DVD; a magnetic tape; a flash removable memory; a memory chip; and/or other types of media that can store machine-readable instructions thereon.

A "computer system" refers to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" refers to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

The terms "urban" and "cityscape" are used to generically refer to geographical areas including manmade structures and do not require any particular density of people, buildings, building heights, etc. For example, geographical areas often considered suburban should be considered urban and should be considered as a cityscape for the purposes of this application.

FIG. 1 illustrates one example of a method to enhance a 3D surface model of a real world cityscape. In step 100, an overhead image is obtained of a cityscape. In the examples provided herein, the overhead image of the cityscape is a satellite image obtained by a satellite, but images may be obtained from other sources, such as other flying vehicles (whether flying through atmosphere or space), such as airplanes, helicopters, unmanned drones (e.g., fixed wing aircraft, multi-rotor, single rotor, etc.), balloons, cameras released from a plane to parachute or glide to ground, etc. Further, use of images other than overhead images may be applied to the disclosed embodiments in place of or in addition to overhead images. For convenience of explanation, the embodiments herein are described with reference to satellite images, but it will be appreciated that the embodiments may use images obtained from other sources. The satellite image may be a picture of the cityscape in the visible spectrum, but other image types may also be taken by the satellite (e.g., infrared photographs). The satellite image may include metadata to provide a geolocation (e.g., latitude, longitude and height) of the satellite when the image was taken (which may be referred to herein as a satellite image location) as well as other information (e.g., RPC model data) to assist in determining geolocations of features in the image (e.g., positions of buildings, building corners, streets, etc. in the image) or simply the locations associated with one one or more pixels of the image. Satellite images may be obtained from public sources, such as the U.S. Geological Survey and NASA.

In step S102, point cloud data of one or more cityscapes may be obtained. Point cloud data may comprise a plurality of points, where each point is identified by a coordinate and represents a point of a determined surface location of an element of a cityscape. For example, the points may be defined using x, y and z coordinates in a Cartesian coordinate system, where the collection of points represents the surface of the cityscape, such as the surface of roads, sidewalks, buildings, etc. The point cloud may be obtained via measurement by a 3D scanner, such as LiDAR (Light Detection and Ranging) which is a remote sensing method that uses light in the form of a pulsed laser to measure distances to the Earth. LiDAR data of a cityscape may be obtained by flying over a location and scanning the ground area with a laser. By scanning a scene, LiDAR may obtain a plurality of distances corresponding to a plurality of surfaces that the laser impinges, and which may be converted to a plurality of 3D locations based on the known 3D location of the LiDAR apparatus (e.g., laser and photodetectors). LiDAR data may be obtained from public sources, such as, e.g., from the United States Interagency Elevation Inventory, the United States National Oceanic Atmospheric Administration (NOAA) and the United States Geological Survey. Each of the points of the LiDAR data may be associated with a known real world longitude, latitude and height (height may be relative to a detected real world ground or relative to a baseline height in the real world, such as a height above sea level). A LiDAR sensing method may provide point cloud data having a resolution of 1 meter or less. The LiDAR data may have finer resolution and accuracy of geolocations associated with the points of the point cloud than geolocations associated with the satellite images. The satellite images may have surface detail (color, texture, etc.) that is not contained in the point cloud data.

In step S104, the cityscape point cloud data is converted into 3D surface model. The 3D surface model may comprise a 3D mesh model or polygonal model, where selected points in the modeling space are connected by line segments, the line segment forming polygons that each represent a surface element of the overall 3D surface model. For example, each surface element may roughly represent a corresponding surface portion in the real world as a plane bounded by its bounding polygon.

In some examples, the LiDAR point cloud data is first converted to a digital surface model (e.g., a digital elevation model including geolocations of buildings and other objects on the surface of the scanned location). Digital surface models (DSMs) is a well understood model, commonly used to refer to the digital elevation models (DEMs) that do not exclude man-made structures from surface information provided by the model. In contrast, digital terrain models are the digital elevation models that only contain the elevation of the barren terrain of the earth and may ignore the existence of man-made structures on such terrain. The LiDAR point cloud data is first converted to a digital surface model through rasterization. For example, the digital surface model (DSM) may be derived from overlying a grid (e.g., parallel to ground level) over the cityscape point cloud data and selecting an appropriate height based on point data within the grid element (e.g., maximum height or average height of point cloud points within the grid element). Thus, each grid element may be identified by an (x, y) coordinate and be associated with a z coordinate to obtain the 3D surface model. The 3D surface model may include surface information (e.g., heights and (x, y) coordinate locations) of urban structures (e.g., buildings or other man made structures) and surface information of the terrain (streets, sidewalks, earth and other landscape surface detail).

The digital surface model may not include information of vertical surfaces, such as sides of buildings or other wall. Thus, a 3D surface model is derived from the digital surface model to provide vertical surface information of buildings that may not have geolocation data in the digital surface model. The 3D surface model may comprise a 3D mesh model or polygonal model, where selected points in the modeling space are connected by line segments, the line segment forming polygons that represent a surface element of the overall 3D surface model. For ease of explanation, the 3D surface model may be referred to as a 3D surface (mesh) model, but 3D surface models may be derived (e.g., that provide surface information of vertical surfaces). In contrast to the digital surface model, the 3D surface (mesh) model may have polygonal elements and vertices (describing or defining the polygonal elements) on vertical surfaces of buildings. Surface elevation data of the digital surface model (e.g., the (x,y,z) coordinates representing a surface location in the digital surface model) is passed to a GPU computer shader module to compute the vertex Cartesian position/normal data and the terrain tessellation factors. Then, a GPU dynamic tessellation technique is used to generate the dynamic 3D mesh surface model based on terrain details. A GPU is well to handle such processing with parallel processing. The GPU may be used to first generate the 3D surface (e.g., mesh) model. From the 3D surface (mesh) model, the GPU may also generate the depth map for selected locations and to create a 2D rendering of the 3D surface (mesh) model for a selected and location viewing direction within the 3D surface (mesh) model. This approach speeds up the mesh generation and reduces the CPU memory usage. Known real world locations associated with the point cloud data may be used to provide (or to derive) real world locations for locations within the 3D mesh model. For example, known real world longitude, latitude and height may be derived from the 3D surface (mesh) model for locations within the 3D surface (mesh) model.

Figure 8:
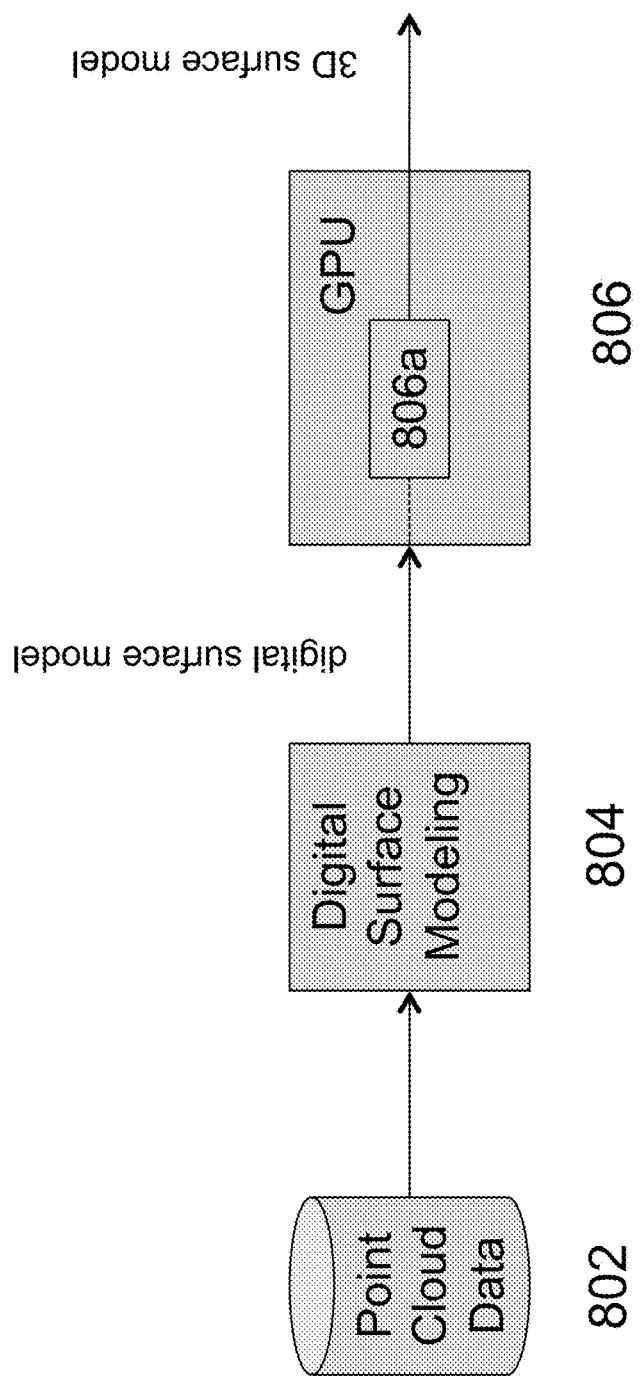
FIG. 8 illustrates an example of obtaining a 3D surface model.

FIG. 8 represents one example of an apparatus for creating the 3D surface model. Point cloud data stored in database 802 (e.g., obtained from LiDAR) may be converted to a digital surface model by modeling module 804. Database 802 may be remote storage, or local storage, such as a hard disk or other computer readable storage medium. Each of the x, y, z geolocation coordinates of the obtained digital surface model may be output directly to shader 806a of GPU (graphics processing unit) 806. Shader 806a of GPU may provide a new set of vertex Cartesian coordinates representing (or used to determine) vertices of the polygons of the mesh. For example, a set of four neighboring geolocation coordinates of the digital surface model may be converted to vertices of several triangles, each triangle being a polygon element of the mesh model. Shader 806a of GPU may implement dynamic tessellation which may allow for simpler meshes to be subdivided into finer meshes (e.g., upon desiring further detail, such as when zooming in on the model for display of further detail) or to larger meshes corresponding to a more distant view while avoiding unnecessary calculations.

Known real world locations (geolocations) associated with the point cloud data may be used to provide (or to derive) real world locations (geolocations) for locations within the 3D surface (mesh) model. For example, known real world longitude, latitude and height may be derived from the point cloud data for locations within the 3D surface (mesh) model. Height may be represented in many ways, such as relative to a global ground point (such as relative to sea level) or relative to a local ground point of the cityscape (such as relative to the lowest ground point in the 3D surface (mesh) model of the cityscape).

In step S106, the 3D surface (mesh) model is used to obtain a 2D image view of the 3D surface (mesh) model from a location corresponding to the satellite image location (the geolocation of the satellite when taking the picture of the cityscape). Conventional transformation functions may be used to perform a translation of the 3D surface (mesh) model to represent a viewpoint of the 3D model from the satellite image location. Such transformation may be performed by standard GPUs and/or GPU processing. For example, a vertex shader of a GPU may be used to transform each vertex's 3D position of the mesh model in virtual space to a 2D coordinate at which it appears from the viewpoint of the satellite. The vertex shader may also determine a depth value for the Z-buffer for each vertex of the mesh model (representing a distance from the viewpoint to the vertex) to determine which portions of the mesh model are viewable and which portions of the mesh model are occluded. For example, for a plurality of rays emanating from the position of the viewpoint of the satellite, intersecting portions of the mesh model with each ray may be evaluated to determine the portion of the mesh model with the smallest depth value to determine the viewable portion, while higher depth values of a portion of the mesh model are considered occluded and not displayed.

Then, a depth calculation may be performed from the satellite image location to the surfaces of the cityscape represented by the 3D surface (mesh) model to determine visible surfaces of the 3D surface (mesh) model from the satellite image location (visible surfaces are those associated with the shortest distance to the satellite image location along a particular direction—in contrast to occluded surfaces that may intersect a particular direction from the satellite image location but are occluded by another surface having a shorter distance to the satellite image location along that particular direction). The 2D image view may be the collection of determined visible surfaces of the 3D surface (mesh) model as viewed from the satellite image location. It should be noted that the 2D image view may not require mapping the visible surfaces of the 3D surface (mesh) model to a single image plane, but may contain 3D data, such as identification of the visible 3D surface (mesh) model elements (e.g., polygonal mesh elements) and associate the same to appropriate x,y coordinates of an appropriate image plane.

In step S108, the 2D image view of the 3D surface (mesh) model from the satellite image location is used to associate visible surfaces of the 2D image view of the 3D surface (mesh) model with the appropriate portion of the image taken by the satellite. In step S110, the 3D surface (mesh) model may be enhanced by providing image detail of the satellite image to the appropriate surfaces of the 3D model (those surfaces of the 3D surface (mesh) model having been associated with the appropriate portion of the image taken by the satellite).

It will be apparent that only some of the surfaces of the 3D surface (mesh) model may be enhanced by a single image taken by a satellite (i.e., only some of the surfaces of the cityscape will be viewed by the image, limiting the surfaces of the 3D surface (mesh) model that may be enhanced). Thus, this method may be performed for a number of satellite images, preferably taken of the cityscape from different azimuth viewing angles (e.g., to view the cityscape at 4 or more or 6 or more azimuth orientations) with large (e.g., >25 degrees) off-nadir (oblique) viewing angles.

Figure 2:
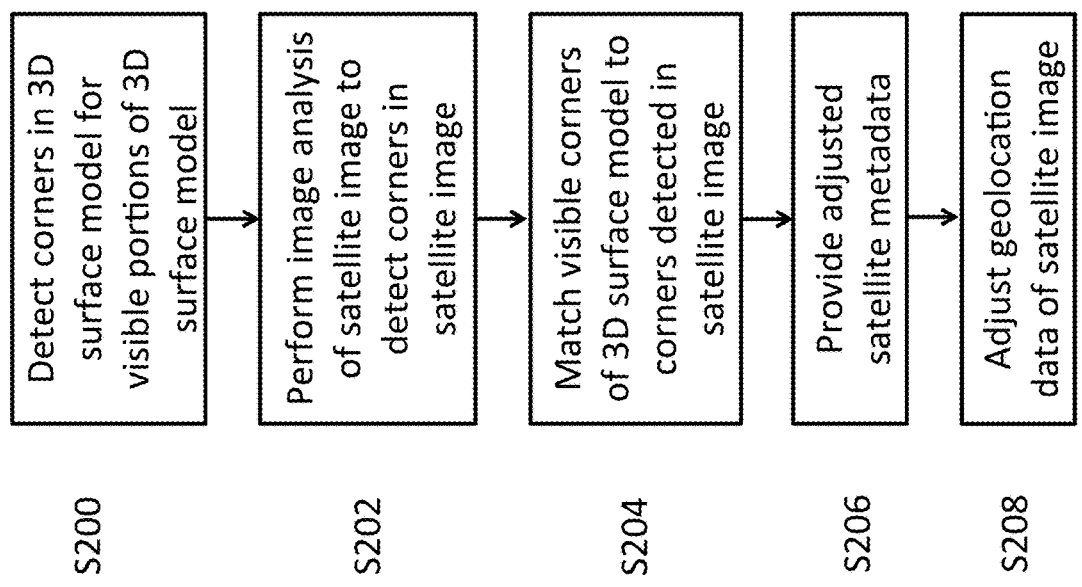
FIG. 2 is an exemplary method of implementing step S108 of FIG. 1.
Figure 6A:
FIGS. 6A-6F show exemplary results.
Figure 6B:
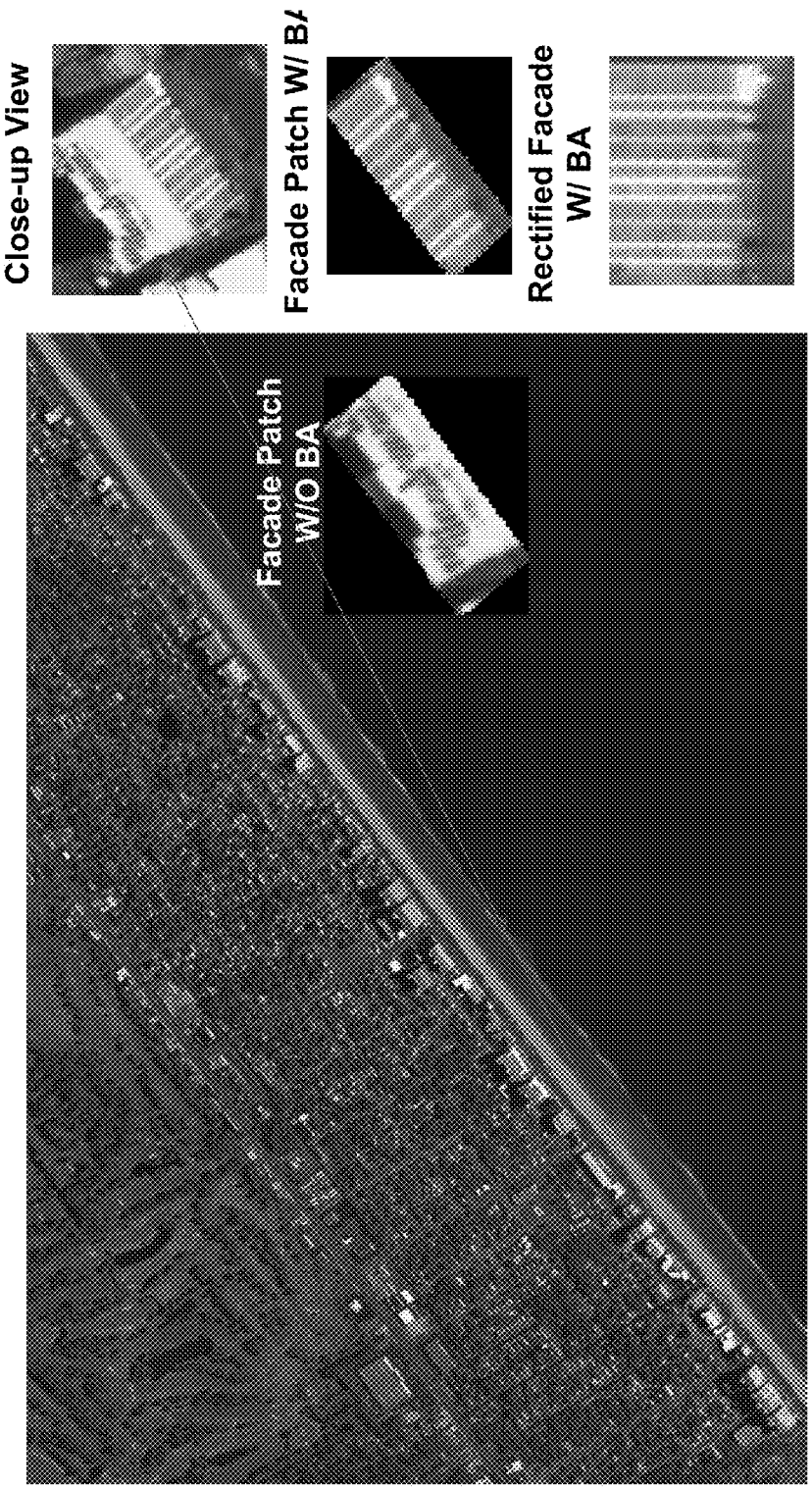
Figure 6C:
Figure 6D:
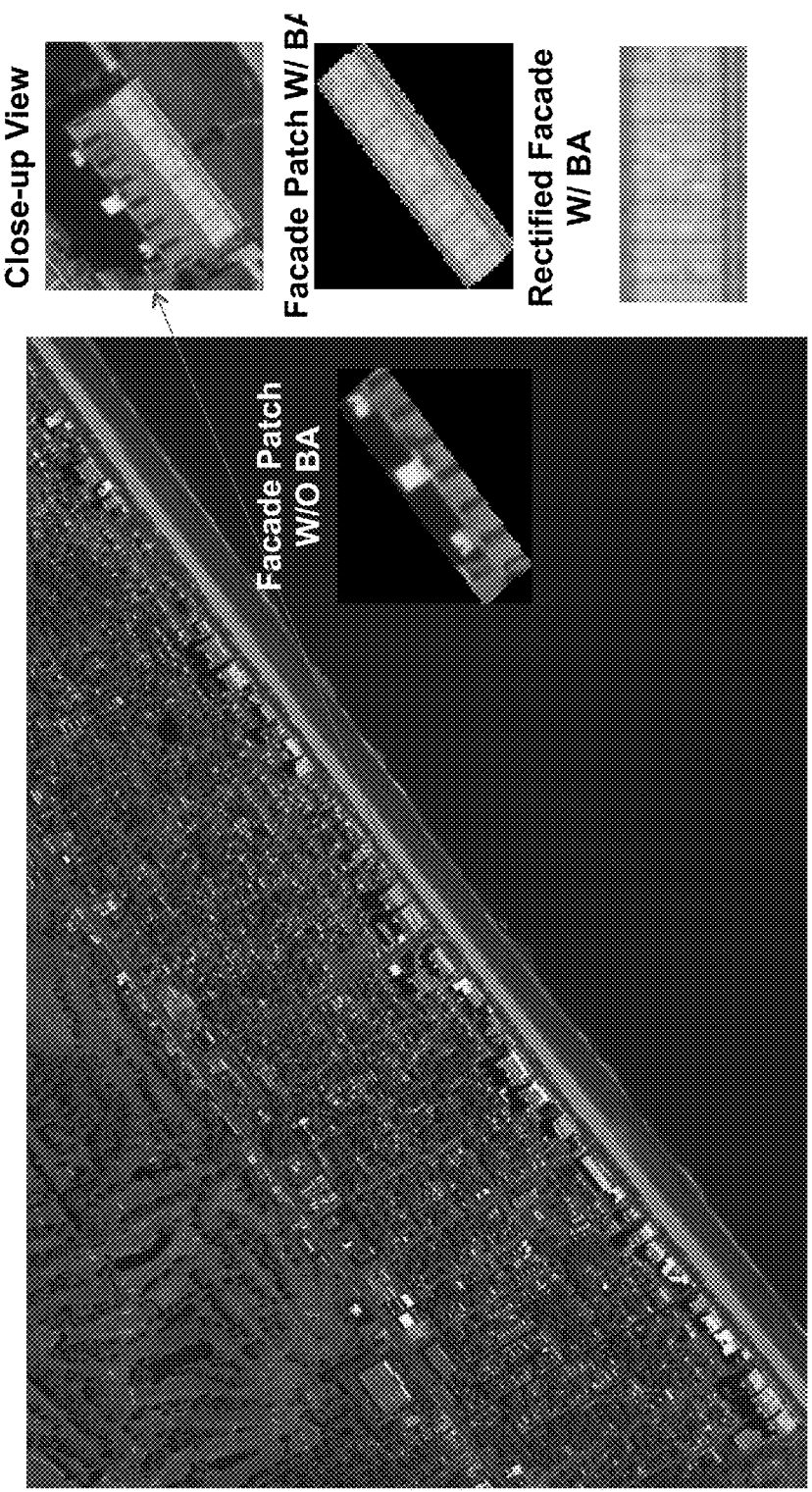
Figure 6E:
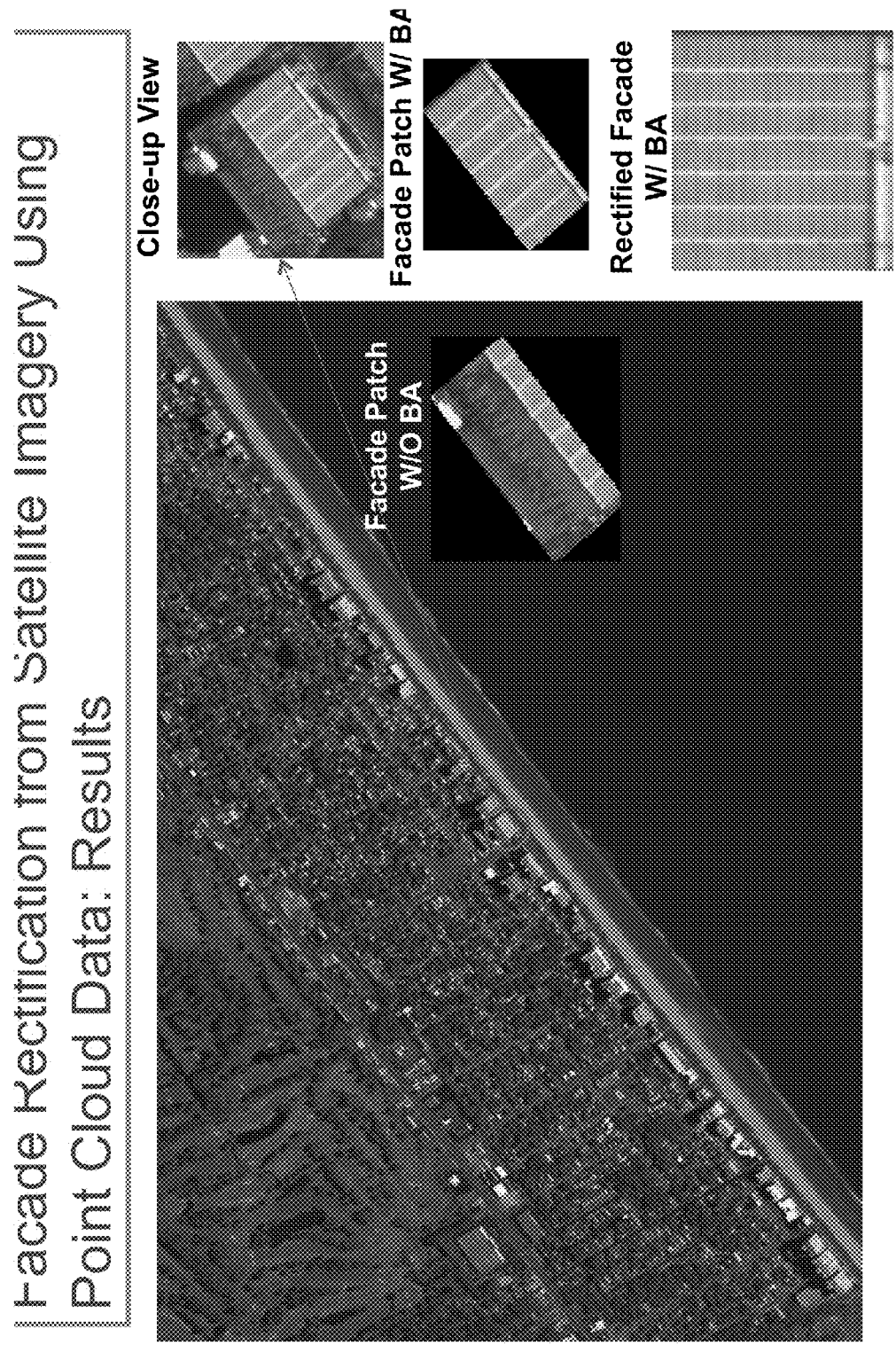
Figure 6F:
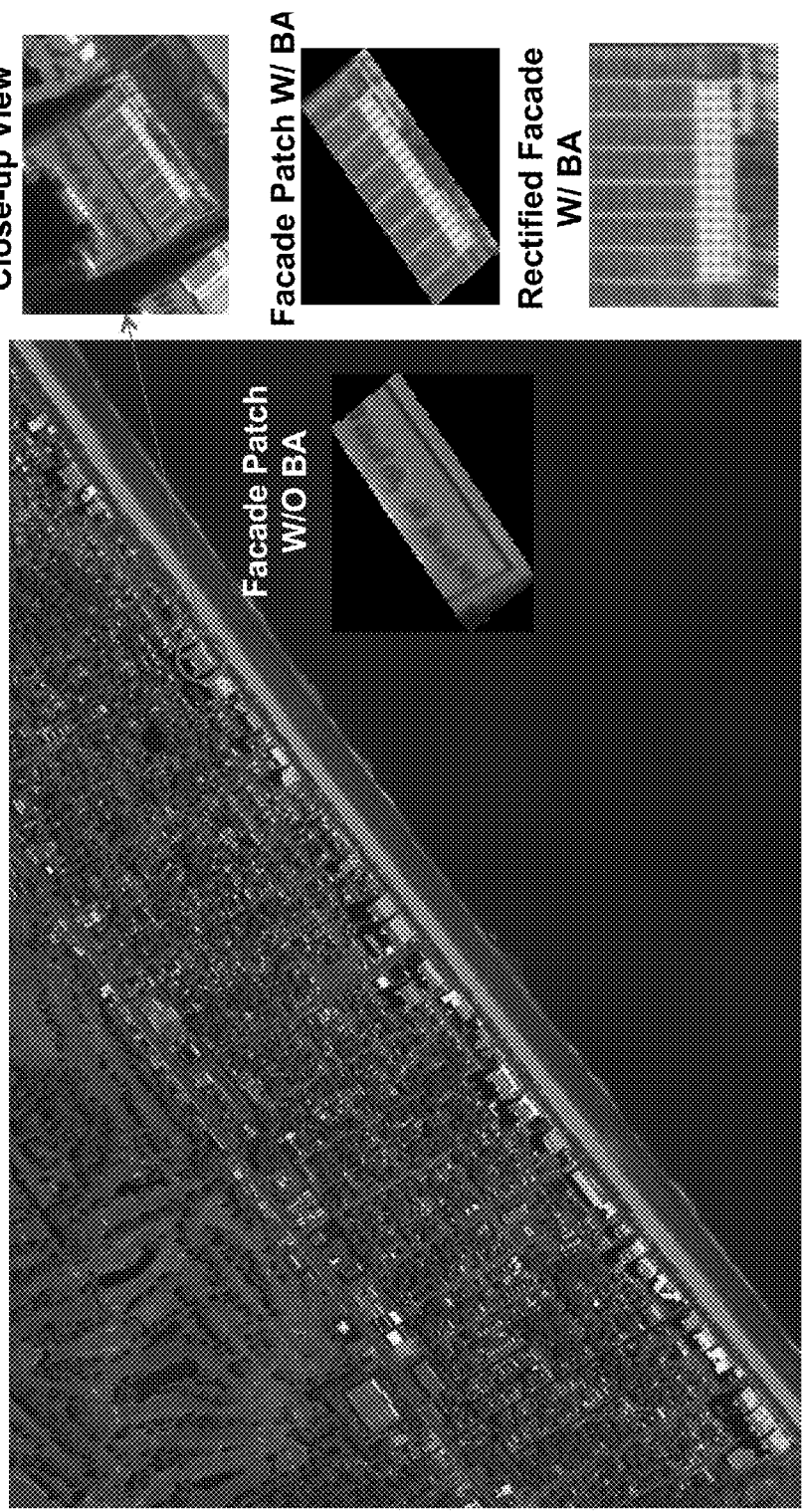

FIG. 2 illustrates an example of a method of further refining the alignment of the 2D image view of the 3D surface (mesh) model obtained using an adjusted RPC model and the satellite image that may be implemented by step S108 in FIG. 1. In step S200, for those portions of the 3D surface (mesh) model that are visible from the satellite image location, corners within the 3D surface (mesh) model are detected. Each detected corner of the 3D surface (mesh) model has a geolocation associated with it. These geolocations may be derived from the point cloud data (which may be translated to the 3D surface (mesh) model) and are typically very accurate when derived from LiDAR.

In step S202, image analysis is performed on the satellite image to detect corners of objects (e.g., buildings) within the satellite image. For example, edge detection may be performed to determine certain boundaries. Edge detection may include image analysis for linear edges by detecting a consistent gradient change (e.g., of intensity) across a line in the image (and thus detect the line as a linear edge). Corners may be detected by image analysis by determining locations where linear edges extending in different directions end at the same (or within a certain tolerance) location. Corners detected by image analysis of the satellite image are provided with an associated geolocation based on the satellite image metadata (providing a known geolocation of the satellite when the picture was taken, as well as the angle at which the picture was taken) as well as RPC model data. Such image metadata information can be used to approximate a geolocation of an associated pixel on the image and therefore determine the approximate geolocation of a pixel of the image assigned or otherwise associated to a detected corner.

In step S204, a correlation analysis is performed to match corners detected in the 3D surface (mesh) model with corners detected in the satellite image. In general, it may be expected that the geolocation of the corners in the 3D surface (mesh) model may be consistently offset by a similar amount in a similar direction to associated corners in the satellite image. Standard correlation calculations may be performed on the sets of detected corners to determine this offset and this direction of offset. This corner correlation may also reveal scaling and warping deviations (e.g., due to lens effects) between the 2D image view of the 3D surface (mesh) model and the satellite image.

In step S206, deviations between the 2D image view of the 3D surface (mesh) model and the satellite image in offset (amount and direction), scaling and/or warping may be used to provide adjusted RPC model variables (or other adjust other metadata associated with the satellite image(s)) to better represent the effects of the satellite camera on the image and thus obtain better geolocation information from all satellite images taken by the satellite image camera. As LiDAR geolocations (and thus the 3D surface (mesh) model geolocations) data are typically more accurate than calculated satellite geolocations, deviations between the 3D surface (mesh) model geolocations and the calculated satellite geolocations may safely be assumed to be an error attributable to the calculated geolocations from satellite images and metadata. This adjusted metadata may be used in future calculations to determine more accurate locations of features in all images taken by such this satellite camera. Step S108 of FIG. 1 may skip step S206 of FIG. 2.

For example, a Rational Polynomial Coefficients (RPC) camera model may be used which may take into consideration physical parameters about the satellite camera. The RPC camera model may include parameters such as one or more of focal length, principal point location, pixel size, lens distortions, etc., of the satellite camera as well as orientation parameters of the image, such as position and attitude. Such RPC data may be provided as metadata associated with the satellite image.

The projection accuracy of this RPC model may be improved by updating the RPC model and the satellite metadata. To update the RPC model, image features such as SIFT features (scale invariant feature transform features) are detected and matched from multiple satellite images. Other features other than SIFT features may be identified and matched, such as building edges, building corners, termination points of elongated projections (such as of structures like a radio tower, telephone pole, etc.) The matched feature correspondences may be used to compute a motion compensation for each satellite image using the Bundle Adjustment method. Bundle adjustment may jointly refine a set of initial camera and structure parameter estimates to obtain the set of parameters that most accurately correspond to the locations of the SIFT features (or other identified and matched points) in the set of satellite images. The resulting motion compensation is then used to update the corresponding RPC and satellite metadata. The 3D surface (mesh) model and the satellite image may then be aligned, taking the detected offset, scaling and/or warping deviations into consideration. After this alignment, the detected corners (or most of the detected corners) within the 2D image view of the 3D surface (mesh) model and the satellite image may be aligned to overlap with respective corresponding corners of the satellite image. Thus, corners within the satellite image (which may be assigned a pixel location) may be assigned an accurate 3D geolocation in step S208 by adopting the corresponding geolocation of the overlapping corner of the 3D surface (mesh) model. Thus, the same corners in both the 3D surface (mesh) model and the satellite image may be identified by the same geolocation information.

It will be appreciated that the adjustment of geolocation information of the satellite image provided by steps S200 to S208 may not be necessary if the 2D image view information of the surface model as provided in step S106 is sufficiently accurate. In this case, steps S200 to S208 may be replaced and step S108 of FIG. 1 may be performed by simply mapping of the 2D image view to the satellite image so that visible surface elements of the 3D surface (mesh) model (e.g., visible polygon mesh elements of a 3D surface mesh model) are associated with corresponding portions of the satellite image by virtue of sharing the same relationship to the appropriate 2D image space (e.g., by sharing the same (x,y) coordinates of the appropriate 2D image space).

FIG. 3 illustrates an example of step S110 of FIG. 1 to enhance the 3D surface (mesh) model with surface detail. In step 300, visible facades of the 2D image view of the 3D surface (mesh) model at the satellite image location are identified. A facade may be determined in the 3D surface (mesh) model by detecting substantially linear edges extending between corners visible in the 2D image view, where the edges form a parallelogram. Alternatively, a facade may be determined in the satellite image by detecting substantially linear edges extending between detected corners, where the edges form a parallelogram. Specifically, the facade may be defined by detected corners (which are matched in both the 3D surface (mesh) model and the satellite image). As the corners of the satellite image and the 3D surface (mesh) model have been matched using the adjusted RPC model, a determination of a facade in one the satellite image and the 3D surface (mesh) model acts to determine a facade in the other.

In step 302, for a particular facade, the portion of the image in the satellite image defined by the corners of the facade (e.g., within the parallelogram formed by these corners) is extracted. In step 304, the portion of the image for the particular facade is associated with the surface of the corresponding facade in the 3D surface (mesh) model. For example, each tile or polygon of a mesh representing the surface of the facade in the 3D surface (mesh) model may adopt the corresponding piece of the portion of the image of the facade as its texture. Step 302 and 304 are repeated for each of the facades detected in step 300. When the 3D surface (mesh) model is a mesh model, each polygonal element of the mesh (e.g., triangle, square, hexagon) may be associated with the appropriate portion of the image so that when any program analyzes or displays the 3D surface (mesh) model, such image portion is appropriately associated or displayed with such element of the mesh model. Thus, the image of a facade may be added to the 3D surface (mesh) model to enhance the detail of the 3D surface (mesh) model. Such enhanced detail may be in the form of data (e.g., color, texture, etc.) associated with vertices of the 3D surface (mesh) model, that may be used to render 2D images using standard GPU and graphic rendering techniques. For example, in rendering a 2D image, display pixels associated with corresponding plural positions within a polygonal element of the 3D surface (mesh) model may have their color and brightness values determined by a GPU by reference to such vertex data of the vertices of the polygon element.

FIG. 4 illustrates an example of adjusting projection models of satellite imagery through analysis of deviations of identified features in plural satellite images through feature matching and bundle adjustment. This bundle adjustment may be used in conjunction with step S100 of FIG. 1 to provide more accurate metadata along with the satellite images of the cityscape. The projection models may be represented as metadata (such as the RPC model parameters describe herein) associated with the satellite image. In FIG. 4, several (n) sets of images and metadata 402 are provided to feature matching module 404. The images may be images of a cityscape taken by the same satellite camera at different locations and may be provide from public sources, as described herein. Each of the satellite images may be with associated metadata, such as the initial estimated RPC model parameters of the satellite and the initial estimated location of the satellite. The images are analyzed by the feature matching module 404 to match features, which may use conventional feature matching techniques. Feature identification in each satellite image may be performed, such as by using scale-invariant feature transform (SIFT). See, for example, U.S. Pat. No. 6,711,293 (herein incorporated by reference in its entirety) as an example of systems and methods for feature identification and description. Other variants of feature identification systems and methods may be used, such as RIFT, G-RIF, SURF, PCA-SIFT, GLOH, FAST corner detection, etc. Detected features in each image should be distinctive and robust to changes in illumination, noise, orientation, etc. Thus, the detected features of each satellite image may be identified and matched between the images even though their location, orientation, scale, spacing, etc. in the real world (as identified or determined based on the satellite image and metadata) may be different in each image. By matching features between the plurality of images, deviations in real world location, orientation, scale, spacing, etc. between the satellite images may be determined.

The satellite image projection model may be used to calculate the geolocations of the matched features/pixels in each satellite image taking into consideration the geolocation of the satellite (longitude, latitude and height) when taking the image as well as camera characteristics (e.g., focal length, lens distortion, etc.). Bundle adjustment module 406 may analyze deviations of the image locations (as well as scale, orientation, etc.) between matched features in the satellite images to determine errors and correct the initial satellite image projection model (e.g., adjust RPC model parameters provided with each satellite image as metadata) associated with the images to thereby obtain corrected satellite image projection models 408 (which may comprise adjusted RPC model parameters and/or adjusted satellite location and/or adjusted satellite orientation). Such adjusted satellite image projection models 408 may be used to provide adjusted geolocation information of each image to determine geolocations of the image (e.g., geolocations of features within the image, such as geolocations associated with pixel elements of the image, such as geolocations of objects identified within the image, such as geolocations of building features). The adjusted satellite image projection models 408 may include or be used to derive adjusted orientation, scale, spacing, etc. of the satellite image and objects represented in the satellite image. Further, such adjusted satellite image projection model (e.g., an adjusted RPC model) may be used in step S106 when obtaining the 2D image view from the 3D surface (mesh) model by transformation of the 3D surface (mesh) model (e.g., by a GPU, such as by a GPU vector shader).

FIG. 5 illustrates an example of using corrected satellite image projection models 408 to derive more accurate satellite image geolocation information to more accurately map portions of satellite images to appropriate corresponding surfaces of the 3D surface (mesh) model. Satellite images (or portions thereof) are mapped on to facades of a 3D surface (mesh) model (such as those constructed from high resolution point cloud data, as described herein). The portions which may be performed using facade identification from corner extraction as described above with respect to FIGS. 1-3. In the example of FIG. 5, high resolution point cloud data 502 may be used to construct a 3D surface (mesh) model as described herein. Visible Building Facade Detection module 504 determines facades of the buildings that are visible (e.g., not occluded by other objects of the within the 3D surface (mesh) model with respect to a location and viewing direction corresponding to a satellite image (as determined by a corresponding corrected satellite image projection model 408). Determination of the visible building facades may be done by conventional GPU and conventional graphic rendering processes, which transform relative locations of the vertices of the 3D surface (mesh) model (and the polygonal elements they represent). For example, special transformations of the 3D surface (mesh) model may comprise modification of locations of all vertices of the 3D surface (mesh) model (with respect to the 3D surface modeling, but not with respect to their geolocations) such that the origin (i.e., at location (0, 0, 0) of the 3D surface (mesh) model) corresponds to the determined location of the satellite relative to the satellite image taken at that satellite location.

The visible building facade detection module 504 may perform depth analysis to determine depth values associated with the vertices of the 3D surface (mesh) model, representing a distance from the new origin (the satellite imaging location) of the 3D surface (mesh) model and the corresponding vertex. The depths associated with the vertices may then be used to determine visible portions of the 3D surface (mesh) model from the viewpoint of the origin (the satellite imaging location) by volume ray casting, where a plurality of rays are generated (starting at the origin, corresponding to the satellite imaging location viewpoint) and projected to the region of interest of the 3D surface (mesh) model to determine what surface location is closest to the origin based upon the depth data associated with each vertex of the mesh model. Rays passing through the polygon element of the 3D surface (mesh) model may have a depth calculated from the vertices defining the polygon element. Depth analysis and volume ray casting (or other visibility determination techniques) may be performed with a standard GPU and standard graphic rendering processes.

For the visible building facades of the 3D surface (mesh) model with respect to the origin (corresponding to the satellite imaging location) as detected by the visible building facade detection module 504, facade corner extraction module 506 determines corner locations within the 3D surface (mesh) model. Corner locations may be determined in several ways, such as by analysis of depth data along a particular direction or area to determine locations having substantially planar geometry (as represented by changes in depths from between equally spaced locations being substantially constant) and determining linear edges of the detected planar geometry (where corner locations are determined as intersections of the determined linear edges). Other analyses may comprise analyses of depth data to determine substantially planar surfaces that have edges meeting at 90 degrees. Facade corner extraction module 506 may output geolocations associated with the detected facade corners. Sets of geolocations may be output, with each set representing detected corners of an associated facade.

Based on the facade corner geolocations output by the facade corner extraction module 506, and a corresponding corrected satellite image projection model 408, module 508 may determine a corresponding pixel in the satellite image (corresponding to the satellite imaging viewpoint/origin). The plural corners associated with one facade are then used to identify a portion of the satellite image corresponding to the building facade (e.g., the portion of an image defined by a polygon having vertices of the satellite image pixels determined to have the geolocations output by the satellite image projection module 508 for that facade.

Image warping module 510 transforms each identified portion of the image corresponding to a facade to appropriately map to the facade within the 3D surface (mesh) module. The facade image patch is rescaled and rotated to generate the texture map for building facade through a homography transformation. This homography transformation is computed using the image locations of the matching facade corners in the facade image patch and the texture map.

FIGS. 6A-6E illustrate examples of enhancing the detail of a (mesh) model obtained from point cloud data. In these examples, facades of satellite images are identified after performing bundle adjustment (B/A) as described with respect to FIG. 4. The large image in FIGS. 6A-6E show a satellite image. The upper right images in FIGS. 6A-6E show a close up view of the satellite image corresponding to a detected facade. The middle right images in FIGS. 6A-6E show the surface of 3D model (e.g., building surface) after mapping the facade identified in the satellite image to the 3D model, from the view point of the satellite image position— the image overlaying the main image in FIGS. 6A-6E shows results obtained when bundle adjustment of FIG. 4 is not performed. The lower right images in FIGS. 6A-6E show the this same surface of the 3D model from another viewpoint (e.g., looking straight on to the surface of the building at street level).

Figure 7:
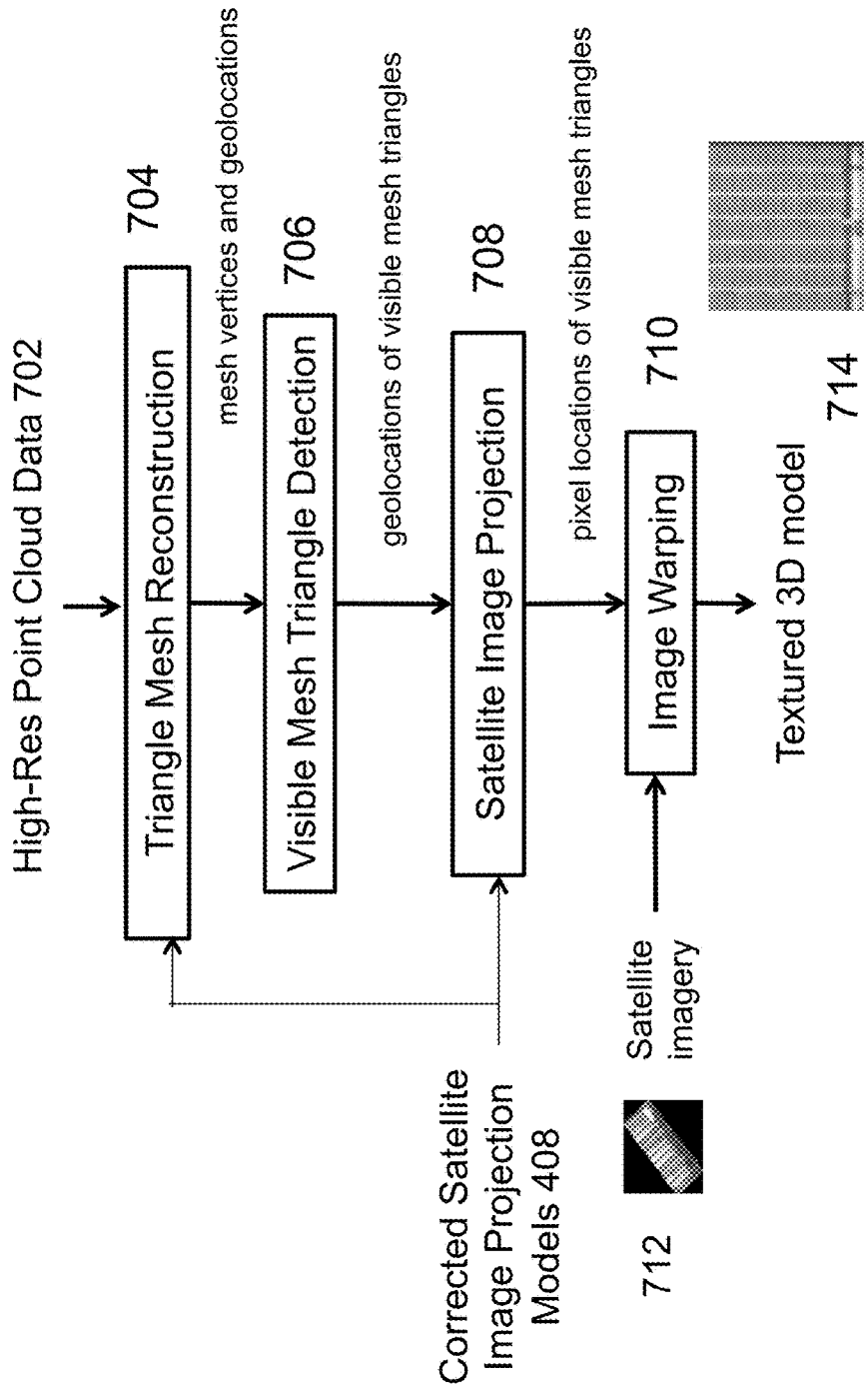

FIG. 7 illustrates an example method including use of corrected satellite image projection models to provide more accurate satellite image geolocation information as described with respect to FIGS. 4 and 5. FIG. 7 differs from FIG. 5 in that satellite images are mapped on to the 3D surface (mesh) model on a mesh unit by mesh unit basis (projecting the mesh tile triangle itself directly onto the satellite image) rather than mapping an entire facade as a single unit, and thus need not identify matching facades between the 3D surface (mesh) model and the satellite image, as discussed with respect to FIG. 5. This method can handle texture mapping on building facades that are partially occluded and partially visible in the given set of satellite images.

The described enhanced 3D surface (mesh) model may be used in many ways. For example, the enhanced 3D surface (mesh) model may provide synthetic street views of cityscapes. The synthetic street view may assist a user with directions in locating a particular address (e.g., as part of a map or direction query). In addition, the synthetic street view may be useful to assist training of soldiers about to enter unfriendly territory where they might encounter combatants.

The described enhanced 3D surface (mesh) model may also be used to train a convolutional neural network (CNN). For example, the CNN may be trained to match a picture with a location. For example, the CNN may be "fed" synthetic pictures taken from the synthetic street view and attempt to match the picture to the location within the enhanced 3D surface (mesh) model using the algorithms associated with trying to match a real picture with a location within a 3D surface (mesh) model of a cityscape (e.g., by matching building/cityscape profiles, such as skyline profiles). As the synthetic pictures may be rapidly obtained via a software program (v. the comparatively lengthy process of obtaining and providing real pictures), CNN training may be rapidly and efficiently advanced.

In addition, the enhanced 3D surface (mesh) model may be used to match a real picture with a location in an enhanced 3D surface (mesh) model of a cityscape. The real picture and the enhanced 3D surface (mesh) model may each have feature matching analysis applied (as described herein). Finding a large set of matched features allows the system to determine where the picture was taken.

It is emphasized that the descriptions herein are exemplary and deviations from which will be recognized to fall within the scope of the invention. For example, while the description has focused on facade imagery, the 3D model may also be enhanced by providing images for other surfaces, including roofs, streets, parking lots, ground (e.g., grass in a park), boulders, etc. It should also be clear that the a 3D model of a single building may be enhanced.

Methods described herein, such as those described with respect to FIGS. 1 and 2 may be implemented on a computer, a computer system and/or network. The computer, a computer system and/or network may be configured with non-transitory computer readable media to cause performance of the methods described herein.

What is claimed is:

1. A method of enhancing urban surface model with image data, comprising:

obtaining a digital surface model (DSM) comprising a plurality of DSM geolocations arranged evenly in a ground plane of the real world, each DSM geolocation representing a surface location of a region of interest in the real world, at least some of the DSM geolocations representing surface locations of buildings within the region of interest;

converting the digital surface model to a three-dimensional (3D) mesh model, the 3D mesh model comprising a plurality of vertices with each vertex of the plurality of vertices being associated with a corresponding location;

obtaining at least a satellite image of at least a portion of the region of interest, the satellite image being associated with metadata, the metadata of the satellite image comprising an estimated geolocation of the satellite at the time of recording the satellite image by the satellite, wherein the estimated geolocation includes a latitude, a longitude, and a height of the satellite at the time of recording;

determining, based on the 3D mesh model and the latitude, the longitude, and the height of the satellite at the time the satellite image was recorded by the satellite, whether a side of a particular building of the buildings in the region of interest was not obstructed by another building from the view from the estimated geolocation of the satellite at the time the satellite image was recorded by the satellite;

in response to determining, based on the 3D mesh model and the estimated geolocation of the satellite at the time the satellite image was recorded by the satellite, that the side of the particular building was not obstructed by another building from the view from the estimated geolocation of the satellite at the time the satellite image was recorded by the satellite, determining geolocations of corners in the 3D mesh model that would be visible from the estimated geolocation of the satellite at the time the satellite image was recorded by the satellite;

identifying pixels in the satellite image based on (i) the geolocations of the corners in the 3D mesh model and (ii) geolocations of the pixels determined based on the estimated geolocation;

extracting a portion of the satellite image with vertices that correspond to the pixels in the satellite image that were identified based on (i) the geolocations of the corners in the 3D mesh model and (ii) the geolocations of the pixels determined based on the estimated geolocation;

storing, in association with the corners in the 3D mesh model, a texture from the portion of the satellite image with the vertices that correspond to the pixels in the satellite image that were identified based on (i) the geolocations of the corners in the 3D mesh model and (ii) the geolocations of the pixels determined based on the estimated geolocation; and providing a two dimensional (2D) image obtained by mapping at least a portion of the 3D mesh model to an image plane, the 2D image including one or more portions based on the texture from the portion of the satellite image.

2. The method of claim 1, wherein the first portion of the satellite image is extracted from a polygon section of the satellite image having first pixels as vertices.

3. The method of claim 1, further comprising warping the first portion of the satellite image to correspond to a view obtained from the 3D mesh model.

4. The method of claim 3, wherein the warping is performed by associating at least some of the first pixels with respective vertices of the 3D mesh model corresponding to the determined corners of the buildings.

5. The method of claim 3, wherein warping is performed by warping the first portion of the satellite image to the shape of the side.

6. The method of claim 1, wherein the digital surface model is obtained from at least one of the following:
United States Interagency Elevation Inventory, the United States National Oceanic Atmospheric Administration (NOAA), the United States Geological Survey, and LiDAR point cloud data.

7. The method of claim 6, wherein the first satellite image is obtained from at least one of the U.S. Geological Survey and NASA.

8. The method of claim 1, wherein the metadata of the first satellite image comprises a satellite image projection model containing camera parameter information.

9. The method of claim 8, further comprising changing the satellite image projection model based upon analysis of a plurality of satellite images of the region of interest, the plurality of satellite images including the first satellite image.

10. The method of claim 9, wherein changing the satellite image projection model comprise matching detected features of different ones of the plurality of satellite images.

11. The method of claim 10, wherein changing the satellite image projection model comprises performing bundle adjustment.

12. The method of claim 1, wherein determining, based on the 3D mesh model and the latitude, the longitude, and the height of the satellite at the time the satellite image was recorded by the satellite, whether a side of a particular building of the buildings in the region of interest was not obstructed by another building from the view from the estimated geolocation of the satellite at the time the satellite image was recorded by the satellite comprises:
determining a distance of an intersection between a ray emanating from the estimated geolocation of the satellite at the time the satellite image was recorded by the satellite to a surface indicated by the 3D mesh model; and
determining whether the side of the particular building of the buildings in the region of interest was not obstructed by another building from the view from the estimated geolocation of the satellite at the time the satellite image was recorded by the satellite based on the distance determined.

13. The method of claim 1,
wherein the image data of the first pixels comprises color data, and
wherein the 2D image is rendered with color responsive to the color data associated with the first pixels.

14. A system comprising:
one or more computers and one or more storage devices storing instructions that are operable, when executed by the one or more computers, to cause the one or more computers to perform operations comprising:
obtaining a digital surface model (DSM) comprising a plurality of DSM geolocations arranged evenly in a ground plane of the real world, each DSM geolocation representing a surface location of a region of interest in the real world, at least some of the DSM geolocations representing surface locations of buildings within the region of interest;
converting the digital surface model to a three-dimensional (3D) mesh model, the 3D mesh model comprising a plurality of vertices with each vertex of the plurality of vertices being associated with a corresponding location;
obtaining at least a first satellite image of at least a portion of the region of interest, the first satellite image being associated with metadata, the metadata of the first satellite image comprising an estimated geolocation of the satellite at the time of recording the satellite image by the satellite, wherein the estimated geolocation includes a latitude, a longitude, and a height of the satellite at the time of recording;
determining, based on the 3D mesh model and the latitude, the longitude, and the height of the satellite at the time the satellite image was recorded by the satellite, whether a side of a particular building of the buildings in the region of interest was not obstructed by another building from the view from the estimated geolocation of the satellite at the time the satellite image was recorded by the satellite;
in response to determining, based on the 3D mesh model and the estimated geolocation of the satellite at the time the satellite image was recorded by the satellite, that the side of the particular building was not obstructed by another building from the view from the estimated geolocation of the satellite at the time the satellite image was recorded by the satellite, determining geolocations of corners in the 3D mesh model that would be visible from the estimated geolocation of the satellite at the time the satellite image was recorded by the satellite;
identifying pixels in the satellite image based on (i) the geolocations of the corners in the 3D mesh model and (ii) geolocations of the pixels determined based on the estimated geolocation;
extracting a portion of the satellite image with vertices that correspond to the pixels in the satellite image that were identified based on (i) the geolocations of the corners in the 3D mesh model and (ii) the geolocations of the pixels determined based on the estimated geolocation;
storing, in association with the corners in the 3D mesh model, a texture from the portion of the satellite image with the vertices that correspond to the pixels in the satellite image that were identified based on (i) the geolocations of the corners in the 3D mesh model and (ii) the geolocations of the pixels determined based on the estimated geolocation; and
providing a two dimensional (2D) image obtained by mapping at least a portion of the 3D mesh model to an image plane, the 2D image including one or more portions based on the texture from the portion of the satellite image.

15. The system of claim 14, wherein the first portion of the satellite image is extracted from a polygon section of the satellite image having first pixels as vertices.

16. A non-transitory computer-readable medium storing software comprising instructions executable by one or more computers which, upon such execution, cause the one or more computers to perform operations comprising:

obtaining a digital surface model (DSM) comprising a plurality of DSM geolocations arranged evenly in a ground plane of the real world, each DSM geolocation representing a surface location of a region of interest in the real world, at least some of the DSM geolocations representing surface locations of buildings within the region of interest;

converting the digital surface model to a three-dimensional (3D) mesh model, the 3D mesh model comprising a plurality of vertices with each vertex of the plurality of vertices being associated with a corresponding location;

obtaining at least a satellite image of at least a portion of the region of interest, the satellite image being associated with metadata, the metadata of the first satellite image comprising an estimated geolocation of the satellite at the time of recording the satellite image by the satellite, wherein the estimated geolocation includes a latitude, a longitude, and a height of the satellite at the time of recording;

determining, based on the 3D mesh model and the latitude, the longitude, and the height of the satellite at the time the satellite image was recorded by the satellite, whether a side of a particular building of the buildings in the region of interest was not obstructed by another building from the view from the estimated geolocation of the satellite at the time the satellite image was recorded by the satellite;

in response to determining, based on the 3D mesh model and the estimated geolocation of the satellite at the time the satellite image was recorded by the satellite, that the side of the particular building was not obstructed by another building from the view from the estimated geolocation of the satellite at the time the satellite image was recorded by the satellite, determining geolocations of corners in the 3D mesh model that would be visible from the estimated geolocation of the satellite at the time the satellite image was recorded by the satellite;

identifying pixels in the satellite image based on (i) the geolocations of the corners in the 3D mesh model and (ii) geolocations of the pixels determined based on the estimated geolocation;

extracting a portion of the satellite image with vertices that correspond to the pixels in the satellite image that were identified based on (i) the geolocations of the corners in the 3D mesh model and (ii) the geolocations of the pixels determined based on the estimated geolocation;

storing, in association with the corners in the 3D mesh model, a texture from the portion of the satellite image with the vertices that correspond to the pixels in the satellite image that were identified based on (i) the geolocations of the corners in the 3D mesh model and (ii) the geolocations of the pixels determined based on the estimated geolocation; and providing a two dimensional (2D) image obtained by mapping at least a portion of the 3D mesh model to an image plane, the 2D image including one or more portions based on the texture from the portion of the satellite image.

* * * * *

UNITED STATES PATENT AND TRADEMARK OFFICE
CERTIFICATE OF CORRECTION

PATENT NO. : 10,430,961 B2  
APPLICATION NO. : 15/382521  
DATED : October 1, 2019  
INVENTOR(S) : Qian et al.

Page 1 of 1

It is certified that error appears in the above-identified patent and that said Letters Patent is hereby corrected as shown below:

In the Claims

In Claim 14, Column 16, Line 16, after "obtaining at least a" delete "first".

In Claim 14, Column 16, Line 17, after "interest, the" delete "first".

In Claim 14, Column 16, Line 18, after "metadata of the" delete "first".

In Claim 16, Column 17, Line 19, after "metadata of the" delete "first".

Signed and Sealed this  
Tenth Day of December, 2019

Andrei Iancu  
*Director of the United States Patent and Trademark Office*